(12) United States Patent
Brady

(10) Patent No.: US 11,542,986 B1
(45) Date of Patent: Jan. 3, 2023

(54) SEALING SYSTEM FOR BEARING ASSEMBLY FOR FLOOR MACHINE

(71) Applicant: Kevin Douglas Brady, Jonesboro, AR (US)

(72) Inventor: Kevin Douglas Brady, Jonesboro, AR (US)

( * ) Notice: Subject to any disclaimer, the term of this patent is extended or adjusted under 35 U.S.C. 154(b) by 0 days.

(21) Appl. No.: 17/526,532

(22) Filed: Nov. 15, 2021

Related U.S. Application Data

(63) Continuation-in-part of application No. 17/038,634, filed on Sep. 30, 2020, now Pat. No. 11,174,899, which is a continuation-in-part of application No. 62/908,264, filed on Sep. 30, 2019.

(51) Int. Cl.
*F16C 33/78* (2006.01)
*F16C 19/16* (2006.01)
*B24B 7/18* (2006.01)

(52) U.S. Cl.
CPC .............. *F16C 33/78* (2013.01); *F16C 19/16* (2013.01); *F16C 33/7886* (2013.01); *B24B 7/18* (2013.01)

(58) Field of Classification Search
CPC .......... F16C 19/06; F16C 19/16; F16C 33/78; F16C 33/7823; F16C 33/783; F16C 33/7886; F16C 33/7896; A47L 11/14; A47L 11/24; A47L 11/28; A47L 11/282; A47L 11/40; A47L 11/4038; A47L 11/4069; B24B 7/18
See application file for complete search history.

(56) References Cited

U.S. PATENT DOCUMENTS

| | | | | |
|---|---|---|---|---|
| 3,074,089 A | * | 1/1963 | Brown, Jr. .......... | A47L 11/4069 74/421 A |
| 3,330,166 A | * | 7/1967 | Rockwell ................ | A47L 11/24 74/606 R |
| 5,979,000 A | * | 11/1999 | Gansow ................ | A47L 11/164 15/52 |

FOREIGN PATENT DOCUMENTS

| | | | | | |
|---|---|---|---|---|---|
| CN | 103899712 A | * | 7/2014 | ............... | B24B 7/18 |
| DE | 818296 C | * | 10/1951 | ............... | F16C 33/60 |
| DE | 4447195 C1 | * | 3/1996 | ............... | A47L 11/305 |
| DE | 102012013988 A1 | * | 1/2014 | ............... | F16C 33/762 |
| EP | 1048261 A2 | * | 11/2000 | ............... | A47L 11/30 |

* cited by examiner

*Primary Examiner* — Phillip A Johnson
(74) *Attorney, Agent, or Firm* — Schrantz Law Firm, PLLC; Stephen D. Schrantz

(57) ABSTRACT

The sealing system seals the bearings of a floor machine. The sealing system provides a sealing base and a sealing head. A seal is positioned between the sealing base and the sealing head to seal the bearing. The sealing base secures to the driver plate. The sealing base extends upward above the bearing. The sealing head is positioned above the sealing base. The sealing head is positioned radially inward of the sealing base at the bearing. The sealing head extends upward above the sealing base and extends outward beyond an upper portion of the sealing base to be located radially outward from the sealing base. The seal is located at an upper portion of the sealing base. The seal is located radially outward from the sealing base. The seal is located below the sealing head at a sealing aperture located between a sealing shoulder and a sealing neck.

20 Claims, 5 Drawing Sheets

SEALING SYSTEM FOR BEARING ASSEMBLY FOR FLOOR MACHINE

CROSS-REFERENCE TO RELATED APPLICATIONS

This application claims priority to and is a continuation in part of U.S. patent application Ser. No. 17/038,634 entitled SEALING SYSTEM FOR BEARING ASSEMBLY FOR FLOOR MACHINE filed on Sep. 30, 2020 that is a continuation of U.S. Patent Application No. 62/908,264 entitled SEALING SYSTEM FOR BEARING ASSEMBLY FOR FLOOR MACHINE filed on Sep. 30, 2019 that is hereby incorporated by reference.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention is related to a sealing system for a floor machine. More specifically, the present invention is related to sealing the bearings of a versatile floor machine capable of completing multiple tasks. The versatile floor machine of the present invention can accomplish preparation for re-coating, chemical stripping jobs, polishing, scrubbing, floor cleaning, baseboard cleaning, wall cleaning, carpet cleaning, grout cleaning, finish removal, floor repair, sanding, glue removal, gum removal, epoxy removal, stone polishing, and other floor needs. The versatile floor machine functions on tile, granite, hardwood, stone, carpet, stairs, grout, concrete, and other flooring surfaces.

The floor machine provides a handle attached to a motor and housing. A floor preparation body attaches to a driver plate secured to the housing for treatment of the flooring. The preparation body varies according to the desired task to be accomplished by the floor machine. The shaft of the motor attaches to an eccentric to an offset position to revolve the preparation body and driver plate around the offset attachment. The motor revolves the preparation body and driver plate to complete the desired task on the floor. Such attachment appears to vibrate the preparation body. In another embodiment, the motor vibrates the preparation body.

The present invention seals the bearings around the driver plate and the eccentric. The seal limits the amount of dirt, grime, water, and other debris to which the bearings are exposed. Limiting the exposure of the bearings to dirt, grime, water, and other debris extends the life of the bearing and improves the functioning of the floor machine.

II. Known Art

Patents and patent applications disclosing relevant information are disclosed below. These patents and patent applications are hereby expressly incorporated by reference in their entirety.

U.S. Pat. No. 8,276,236 issued to Goodman et al. on Oct. 2, 2012 ("the '236 patent") teaches a baseboard cleaning apparatus for cleaning a baseboard of a wall extending upright along the wall with respect to a floor includes a cleaning head and a block positioned in either side of a skid plate, and which are connected by a connector that extends through a slot formed in the skid plate. The skid plate taught by the '236 patent has a lower extremity formed with a skid, and the connector is movable along the slot between lowered positions of the baseboard cleaning head and the fixture toward the skid formed in the lower extremity of the skid plate, and raised positions of the baseboard cleaning head and the fixture away from the skid formed in the lower extremity of the skid plate.

U.S. Pat. No. 7,418,758 issued to Avila on Sep. 2, 2008 teaches an apparatus for cleaning a baseboard of a wall generally comprises an extendable handle to which a friction decreasing device such as a wheel, an adsorbent/desorbent pad and a pad compression device are assembled in a manner such that the lower end of said apparatus can be immersed in a bucket of water.

U.S. Pat. No. 7,296,943 issued to Sandoval on Nov. 20, 2007 ("the '943 patent") teaches an apparatus for cleaning a baseboard of a wall that may include pads and a handle. A front surface of at least one of the pads taught by the '943 patent may be configured to contact a portion of the baseboard during use. A liquid dispenser taught by the '943 patent may be provided to wet one or more of the pads during use. A portion of the handle taught by the '943 patent may be angled to extend away from the wall and rearward from the pad during use. Top pads taught by the '943 patent may be provided for cleaning a top face of the baseboard. The top pads taught by the '943 patent may be vertically and horizontally adjustable relative to a holder to accommodate baseboards of various dimensions.

U.S. Pat. No. 5,533,222 issued to Lelkes et al. on Jul. 9, 1996 ("the '222 patent") teaches a floor machine for cleaning a floor and/or wall and/or downward upstanding from the wall, includes at least one disc having a floor cleaning pad covering a lower surface and wall cleaning material projecting from its periphery. The wall cleaning material taught by the '222 patent may be bristles or a wrap-around separate strip of abrasive felted material, or a margin of the floor cleaning pad may be bent upwardly to form a vertical cylindrical surface. Alternatively, floor pads taught by the '222 patent may be stacked to present a vertical cylindrical wall cleaning surface. The disc taught by the '222 patent may be engaged with a drive shaft, or stacked discs may interengage with each other, the topmost being engaged with the drive shaft. The bottom disc taught by the '222 patent may have a bevel rising from the lower surface. Bristles taught by the '222 patent extend from the bevel at right angles. When the floor machine rests on the floor in operation position, the bristles extending from the bevel taught by the '222 patent are bent upwardly to be forced towards the angle between floor and wall.

U.S. Pat. No. 5,331,703 issued to Mejia et al. on Jul. 26, 1994 teaches a power driven floor and baseboard scrubber is provided having reciprocating plates with scrubbing pads thereon arranged to clean an area at an intersection of the floor and the baseboard, on a stair step and its riser. A handle taught by the '703 patent is provided for operational purposes and wheels for transportation.

U.S. Pat. No. 5,173,985 issued to Palmer on Dec. 29, 1992 ("the '985 patent") teaches a foot mounted scrubber device is provided for use in scrubbing and cleaning selected problem areas of a floor, and along adjacent baseboard surfaces and the like. The scrubber device taught by the '985 patent comprises a relatively flat sole plate, in combination with a toe upper and an elastic heel strap for securely mounting the sole plate onto a shoe in a position underlying the ball region and toes of a user's foot. The sole plate taught by the '985 patent defines an abrasive scrubber surface which can be applied against a problem area to be cleaned through the use of the leg muscles in combination with the user's body weight. In a preferred form, the '985 patent teaches that the sole plate and toe upper cooperatively define a pointed forward toe lined with an abrasive scrubber material for use in cleaning baseboard surfaces and corners and the like along the edge of the floor.

U.S. Pat. No. 4,024,597 issued to Fouracre on May 24, 1977 teaches a housing that contains a motor driven by an electrical source and a shaft connected to the motor drives a brush which can clean a tile floor while a bevelled gear attached to the shaft may drive a second bevelled gear connected to a perpendicular shaft which passes through the housing, a brush attached to the perpendicular shaft may clean a sideboard while if the edge of the sideboard cleaning brush is bevelled then the baseboard cleaning brush may also clean the bevelled corner between the floor and the baseboard.

U.S. Publication No. 20130061414 to Swist on Mar. 14, 2013 ("the '414 publication") teaches a cleaning system that is provided comprising a compliant pad and a consumable pad for use in conjunction with a variety of cleaning implements. The compliant pad taught by the '414 publication may according to embodiments of the invention provide for both compliance to the contour of the surface being cleaned but also allows for the compliant pad to provide for controlled release of fragrance, solvents, cleaning agents etc within the matrix or matrices provided in its construction. Likewise the consumable pad taught by the '414 publication may provide elements providing dust attraction/retention, abrasion, as well as controlled release of fragrance, solvents, cleaning agents etc within the materials provided in its construction. According to embodiments of the invention the compliant pad and/or consumable pad taught by the '414 publication are water soluble to provide this release wherein the water is provided either from within one or both of the compliant pad and consumable pad or from the cleaning implement to which they are attached.

U.S. Publication No. 20110191972 issued to Goodman on Aug. 11, 2011 ("the '972 publication") teaches a baseboard cleaning apparatus for cleaning a baseboard of a wall extending upright along the wall with respect to a floor includes a cleaning head and a block positioned in either side of a skid plate, and which are connected by a connector that extends through a slot formed in the skid plate. The skid plate taught by the '972 publication has a lower extremity formed with a skid, and the connector is movable along the slot between lowered positions of the baseboard cleaning head and the fixture toward the skid formed in the lower extremity of the skid plate, and raised positions of the baseboard cleaning head and the fixture away from the skid formed in the lower extremity of the skid plate.

U.S. Publication No. 20080145132 to Sandoval on Jun. 19, 2008 ("the '132 publication") teaches a device for cleaning trim of a room includes a head and a handle. The head taught by the '132 publication includes at least one first cleaning portion that can clean a first surface of the trim by moving the head in a lengthwise direction of the trim and at least one second cleaning portion that can clean a second surface of the trim by moving the head lengthwise direction of the trim, the second surface being above the first surface and not co-planar with the first surface. The head includes a removable cover. At least part of the first cleaning portion and at least part of the second cleaning portion are formed in the removable cover taught by the '132 publication.

U.S. Publication No. 20040083579 to Furr-Britt on May 6, 2004 ("the '579 publication") teaches a dual handle attachment for a floor appliance, e.g., vacuum cleaner, large push broom, mop, squeegee, etc., allows a user of the appliance to manipulate or maneuver the appliance using generally symmetrical upper body, arm, wrist, and hand forces and movements, thereby obviating the need for asymmetrical twisting and the greater strength required to manipulate such a device using only a single arm and hand. The present attachment taught by the '579 publication comprises a single central bracket which attaches to the conventional single handlebar of such an appliance, with a left and a right handgrip adjustably extending from the central bracket. The two handgrips taught by the '579 publication may be pivotally adjusted by the user as desired, and may be interchanged for handgrips having different shapes or configurations as desired. One embodiment taught by the '579 publication may be removably secured to the appliance, with another embodiment providing for permanent attachment as an integral part of the appliance at the time of manufacture.

SUMMARY OF THE INVENTION

The present invention is related to a sealing system for a floor machine for re-coating, stripping, polishing, scrubbing, cleaning, finish removal, floor repair, sanding, and other floor needs. The floor machine provides a handle attached to a motor and housing. The shaft of the motor attaches to an eccentric to an offset position to revolve the preparation body around the offset attachment. The motor revolves the preparation body to complete the desired task on the floor. Such attachment appears to vibrate the preparation body. In another embodiment, the motor vibrates the preparation body.

The sealing system provides a sealing base and a sealing head. A seal is positioned between the sealing base and the sealing head to seal the bearing.

The sealing base secures to the driver plate. The sealing base extends upward above the bearing. The sealing head is positioned above the sealing base. The sealing head is positioned radially inward of the sealing base at the bearing. The sealing head extends upward above the sealing base and extends outward beyond an upper portion of the sealing base to be located radially outward from the sealing base.

The seal is located at an upper portion of the sealing base. The seal is located radially outward from the sealing base. The seal is located below the sealing head at a sealing aperture located between an inner portion of the sealing base and an outer portion of the sealing head.

It is an object of the present invention to extend the life of the bearings.

It is another object of the present invention to seal bearings to limit exposure of the bearings to dirt, water, and other debris.

It is another object of the present invention to force water, dirt, and other debris to travel upwards beyond a seal to reach the bearings.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
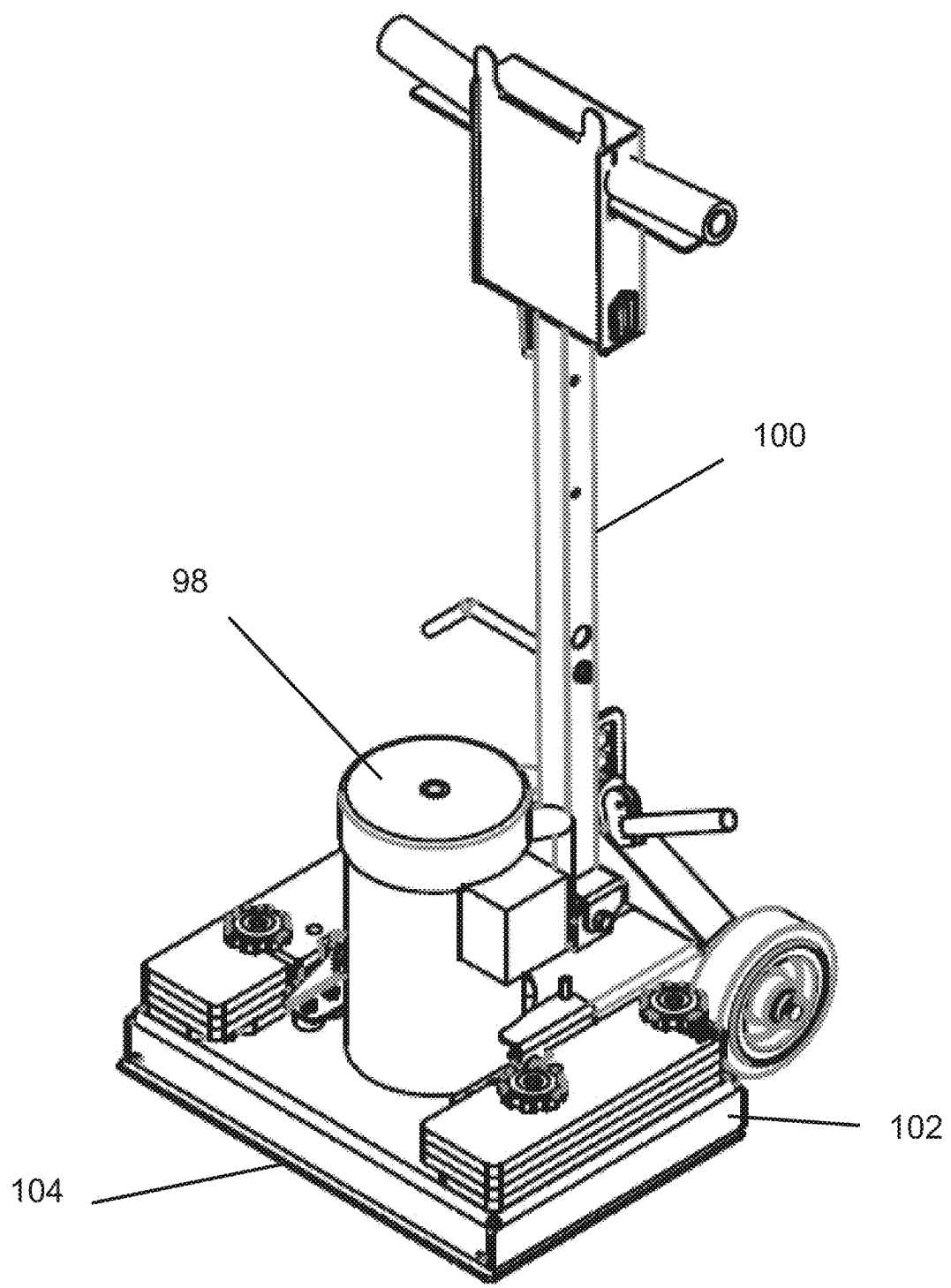
FIG. 1 is an environmental view of one embodiment of the present invention.
Figure 2:
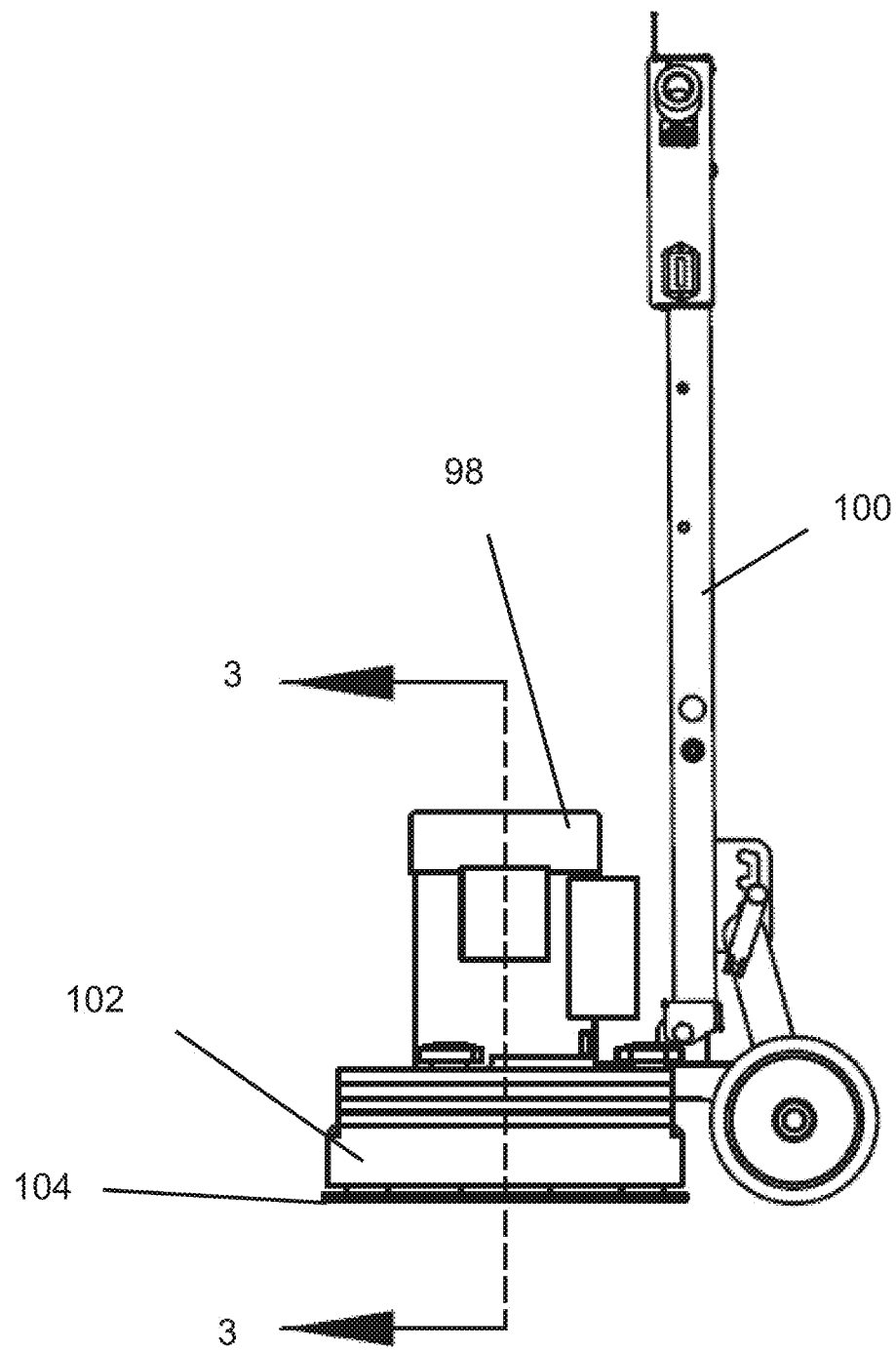
FIG. 2 is a right side environmental view thereof.

FIGS. 1-2 show the floor machine 100 with motor 98 and housing 102. The housing 102 protects the eccentric and bearings within the housing 102. A power cord is plugged into a power source that powers the motor 98. The motor 98 revolves the driver plate 104 that secures to the preparation body. The preparation body secures to the driver plate 104 for contacting the floor.

The floor machine 100 prepares and/or cleans the floor. Operation of the floor machine 100 under such conditions exposes the internal components to dirt, water, and other debris. Such exposure of the internal components to dirt, water, and other debris could potentially damage or reduce the life of the internal components of the floor machine. To resolve such an issue, the sealing system seals the bearing assemblies and the bearings.

Figure 3:
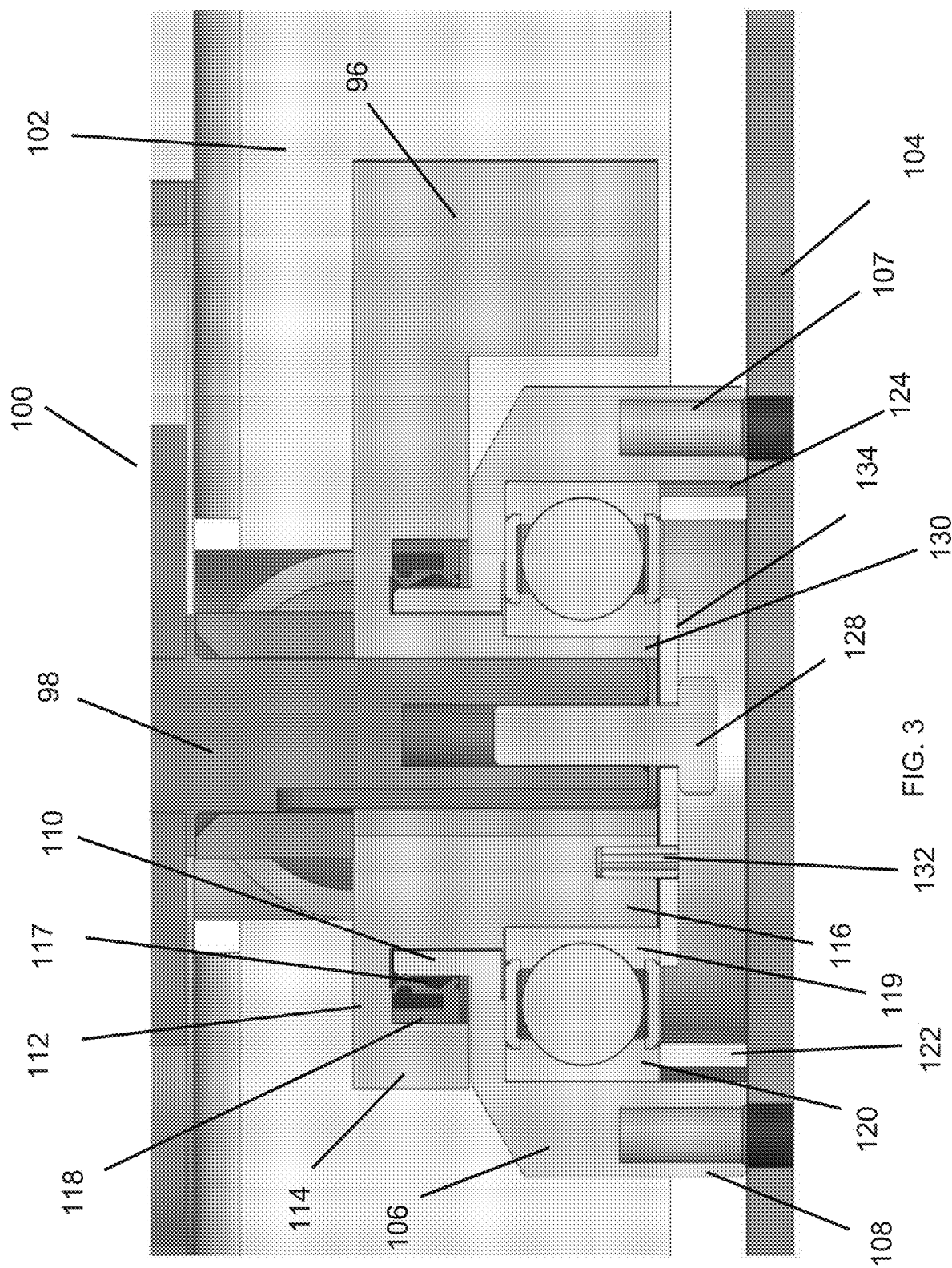
FIG. 3 is a sectional view thereof.
Figure 4:
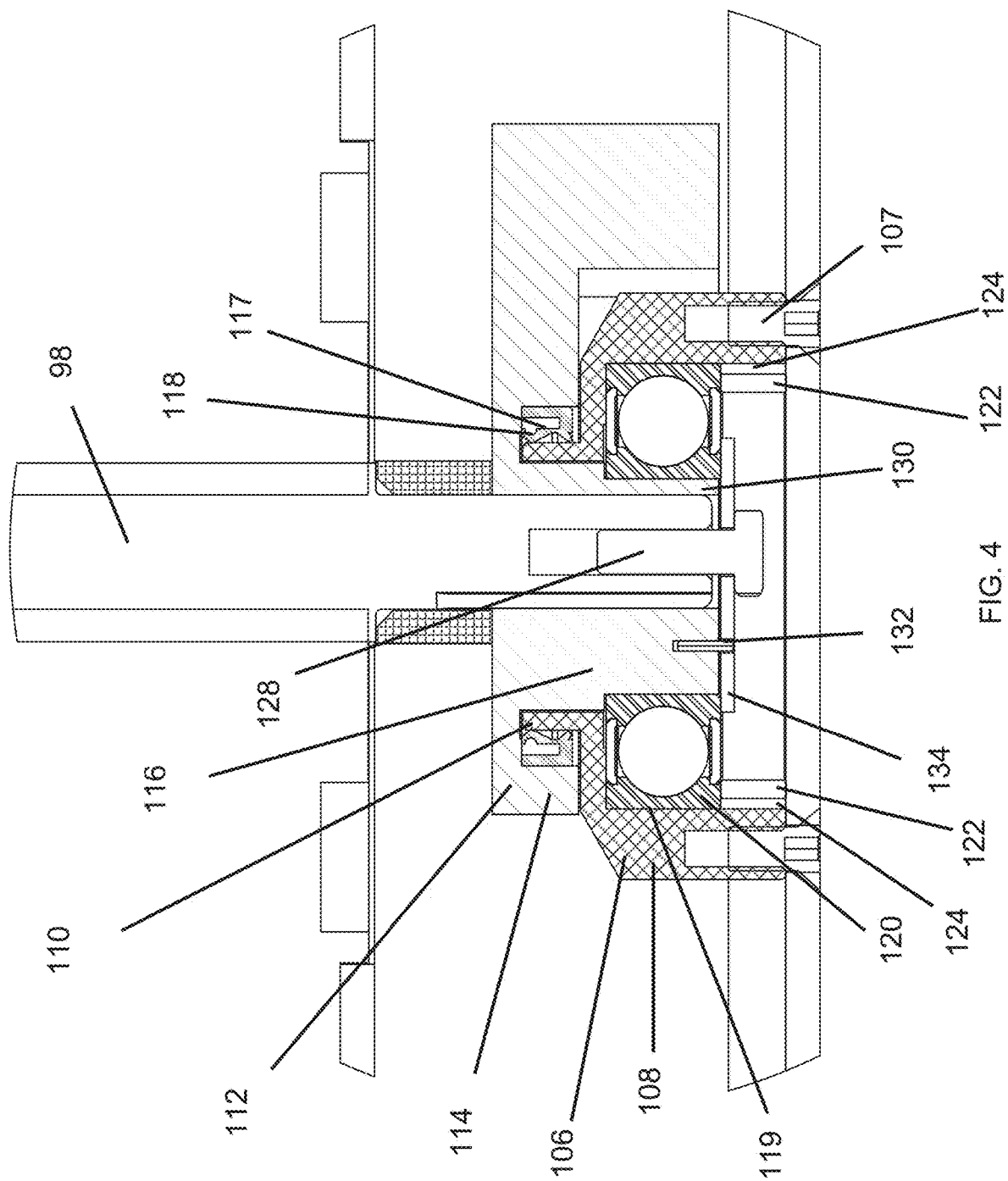
FIG. 4 is a sectional view thereof.
Figure 5:
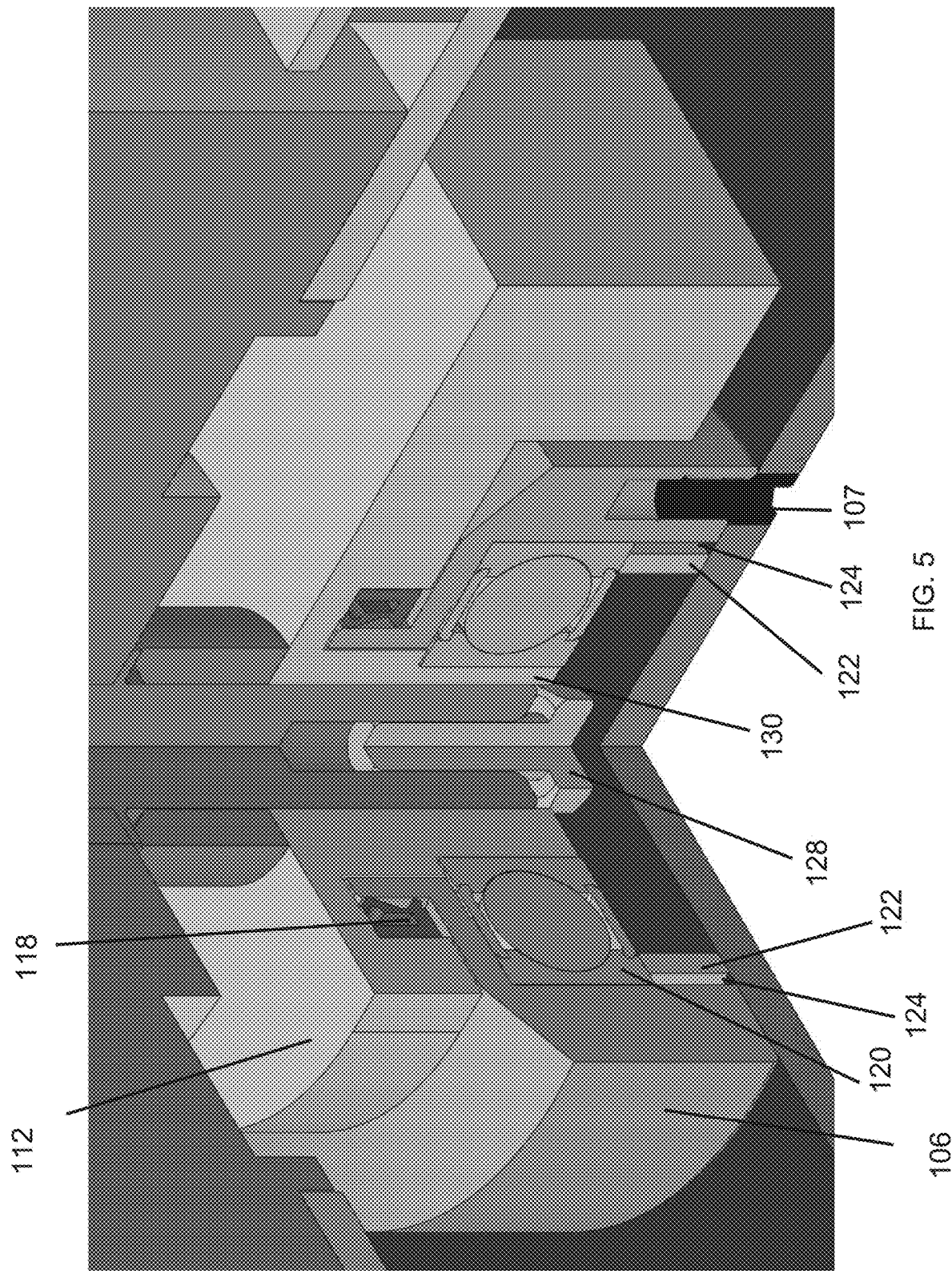
FIG. 5 is a perspective view thereof.

FIGS. 3-5 show more detailed views of the sealing system 96 within the housing 102 of the floor machine 100. The driver plate 104 secures to the eccentric 130 and the motor 98 via shaft fastener 128 and fastener 107. The eccentric 130 attaches to driver plate 104. Eccentric 130 offsets the attachment of the driver plate 104 with the motor. Shaft fastener 128, fastener 107, and sealing base 106 secure the eccentric 130 with the motor 98. Offsetting shaft fastener 128 in relation to the driver plate 104 enables the driver plate 104 to revolve around the shaft fastener 128.

A spacer ring 122 is located radially outward from an inner race of the bearing 120. The spacer ring 122 is also positioned below the bearing 120. The spacer ring 122 seats the bearing 120 to maintain the positioning of the bearing 120. Opening 124 provides additional space between the spacer ring 122 and the sealing base 108.

The sealing system 96 provides a sealing base 106 and a sealing head 114. The sealing base 106 and sealing head 114 position a seal 118 above the bearings 120. The bearings 120 are positioned within the bearing aperture 119 between the sealing head 112 and the sealing base 106. The sealing base 106 secures to the driving plate 104. The sealing head 112 is positioned above the sealing base 106. Seal 118 is placed between the sealing head 110 and the sealing base 106. In one embodiment, the seal is a double lipped seal or a double lipped axle seal. The seal 118 is positioned within a seal aperture 117 formed radially between the sealing head 112 and the sealing base 106.

The sealing base 106 provides a sealing leg 108 that accepts a fastener 107 to secure the sealing base 106 to the driving plate 104. The sealing leg 108 is located radially outward from the eccentric 130 and the bearings 120.

The sealing base 106 extends upward above the bearings 120 at sealing neck 110. The sealing neck 110 is located radially outward from the innermost portion of the bearings 120. The sealing neck 110 extends upward above the bearings 120 and extends partially across an upper surface of the bearings 120. The sealing base 106 is positioned radially outward from the most radially inward portion of the bearings 120 and extends radially inward above the bearings 120. The sealing base 106 of one embodiment only partially extends across the bearings 120. The sealing neck 110 provides a contact surface for the seal 118 to contact to seal the bearings 120. The contact surface of neck 110 is located radially outward from a radial innermost surface of the bearings 120.

The sealing head 112 is positioned above the sealing base 106. The sealing head 112 provides a sealing shoulder 114 and a sealing body 116. The sealing body 116 is located radially inwards from the bearings 120. The sealing head 112 extends upward above the bearing 120 and extends at least partially across an upper surface of the bearings 120. In one embodiment, the sealing head 112 extends radially across the bearings 120. In another embodiment, the sealing head 112 extends partially across the bearings 120 and is located radially inward from the most radially outer portion of the bearings 120.

The sealing head 112 and the sealing base 106 form a sealing aperture 117. The sealing aperture 117 is located between the sealing shoulder 114 and the sealing neck 110. The sealing aperture is located above the bearings 120. The sealing aperture 117 is located radially between the innermost radial portion of the bearings 120 and the outermost radial portion of the bearings 120.

The seal 118 is positioned above the bearings 120 within the sealing aperture 117. The seal 118 contacts the seal surface of the sealing neck 110. The seal surface is located above the bearings 120. The seal surface of the sealing neck 110 is located between the radial outermost portion of the bearings 120 and the radial innermost portion of the bearings 120.

The sealing base 106 is positioned radially outward from the bearings 120 and extends radially inward above the bearings 120. The sealing base 106 of one embodiment only partially extends across the bearings 120. The sealing neck 110 provides a contact surface for the seal 118 to contact to seal the bearings 120. The contact surface of neck 110 is located radially inwards from the innermost surface of the bearings 120.

The sealing body 116 secures to eccentric plate 134 via fastener 132. Eccentric plate 134 is positioned below the bearings 120 and between the bearings. The shaft fastener 128 extends through the eccentric plate 134 into the shaft 98 for securing the eccentric 130. The eccentric plate 134, such as a ring, seats the bearings 120 to limit downward movement of the bearings 120.

The sealing system 96 forms a seal around the bearings 120. The sealing system 96 closes a bottom surface of the floor machine. The sealing system 96 directs dirt, debris, and water upwards above the bearings. The seal 118 placed between the sealing base and the sealing head limits the amount of dirt, debris, and water that can travel upward beyond the seal 118 and above the sealing neck to reach the bearings. Such a sealing system 96 reduces the amount of dirt, debris, and water that reaches the bearings 120. The seal 118 increases the lifespan of the floor machine and reduces wear and tear on the bearings.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A sealing system for sealing a bearing around a shaft of a floor machine, the system comprising:
    a sealing base that seats a seal to seal the bearing, wherein the sealing base seats the bearing around the shaft;
    a sealing head that extends vertically above the sealing base, wherein the sealing head seats the seal to seal the bearing;
    the seal positioned between the sealing head and the sealing base;
    a bearing aperture located between the sealing base and the sealing head, wherein the bearing aperture is located vertically below the seal, wherein the bearing is located in the bearing aperture, wherein the seal seals the bearing positioned within the bearing aperture.

2. The system of claim 1 wherein the bearing aperture is located off center of the shaft.

3. The system of claim 1 wherein the sealing base is located radially outward from the sealing head at the bearing.

4. The system of claim 3 wherein the sealing head is located vertically above the seal.

5. The system of claim 4 wherein the sealing base is located vertically below the seal.

6. The system of claim 1 wherein the sealing head is located radially outward from the seal.

7. The system of claim 6 wherein the sealing head is located radially inward from the seal.

8. The system of claim 7 wherein the sealing head extends radially across the seal above the seal.

9. The system of claim 1 wherein the sealing head positioned radially outward of the seal seats the seal against the sealing base, wherein the seal seals against the sealing base.

10. The system of claim 9 further comprising:
    a sealing lip of the seal wherein the sealing lip contacts an outer surface of the sealing base to seal radially inward against the outer surface of the sealing base.

11. A sealing system for sealing a bearing around a shaft of a floor machine, the system comprising:
    a driver plate configured to be driven by the shaft;
    a sealing base that secures to the driver plate, wherein the sealing base seats a seal to seal the bearing;
    a sealing head that extends vertically above the sealing base, wherein the sealing head seats the seal to seal the bearing;
    the seal positioned between the sealing head and the sealing base;
    a bearing aperture located between the sealing base and the sealing head, wherein the bearing aperture is located vertically below the seal, wherein the bearing is located in the bearing aperture, wherein the seal seals the bearing positioned within the bearing aperture.

12. The system of claim 11 wherein the sealing base is located vertically between the seal and the bearing aperture.

13. The system of claim 11 wherein the sealing base is located radially outward from the sealing head at the bearing aperture.

14. The system of claim 11 further comprising:
    a sealing contact on an outer surface of the sealing base, wherein the seal contacts the sealing contact of the sealing base to seal against the sealing base.

15. The system of claim 14, wherein the sealing base is located radially inward of the seal at the sealing contact.

16. The system of claim 15, wherein the sealing head is located radially outward of the seal at the sealing contact.

17. The system of claim 16, wherein the sealing head is located radially inward of the seal at the sealing contact, wherein the sealing contact is located between an outer portion of the sealing head and an interior portion of the sealing head, wherein the sealing base is located between the outer portion of the sealing head and the interior portion of the sealing head at the sealing contact.

18. A sealing system for sealing a bearing around a shaft of a floor machine, the system comprising:
    a driver plate configured to be driven by the shaft;
    a sealing base that secures to the driver plate, wherein the sealing base seats a seal to seal the bearing;
    a sealing head that extends vertically above the sealing base, wherein the sealing head seats the seal to seal the bearing;
    a shaft aperture extending along a vertical axis through the sealing head and the sealing base;
    the seal positioned between the sealing head and the sealing base;
    a sealing contact on an outer surface of the sealing base, wherein the seal contacts the sealing contact of the sealing base to seal against the sealing base;
    a bearing aperture located radially between the sealing base and the sealing head, wherein the bearing aperture is located vertically below the seal, wherein the bearing is located in the bearing aperture;
    wherein the sealing head is located radially inward of the sealing contact and radially outward of the sealing contact at a vertical position of the sealing contact, wherein the sealing head extends radially outward above the seal and the sealing contact while extending radially across the seal.

19. The system of claim 18, wherein the sealing base is located radially inward of the seal at the sealing contact, wherein the sealing base is located radially outward of the seal vertically below the sealing contact.

20. The system of claim 19, wherein an outer surface of the sealing head extends downward radially outward of the seal across the sealing contact, wherein an inner surface of the sealing head extends downward radially inward of the seal across the sealing contact, wherein the sealing contact is located between the outer surface of the sealing head and the inner surface of the sealing head, wherein the sealing base is located between the outer surface of the sealing head and the inner surface of the sealing head at the sealing contact.

* * * * *